Oct. 28, 1969     W. CORDES     3,475,045
PICTURE DEMONSTRATION VEHICLE
Filed April 25, 1967
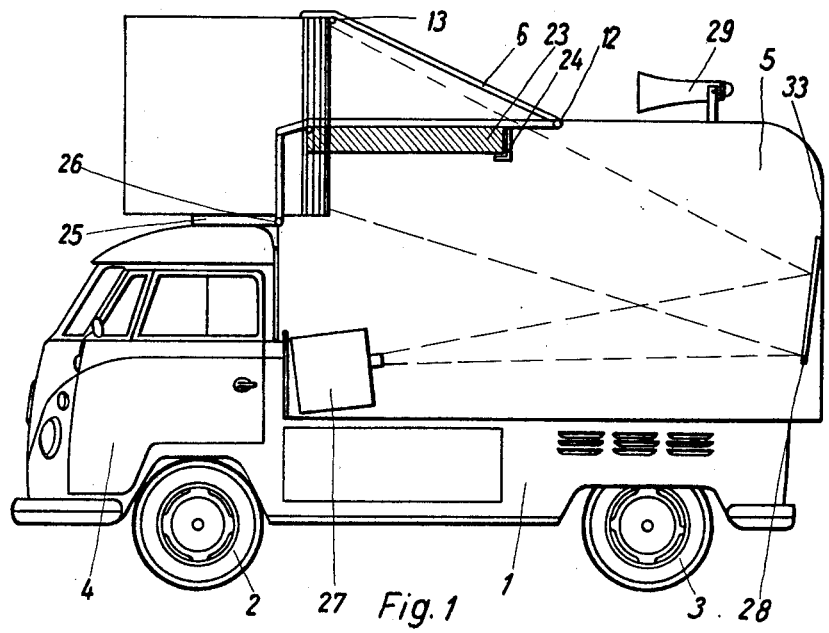
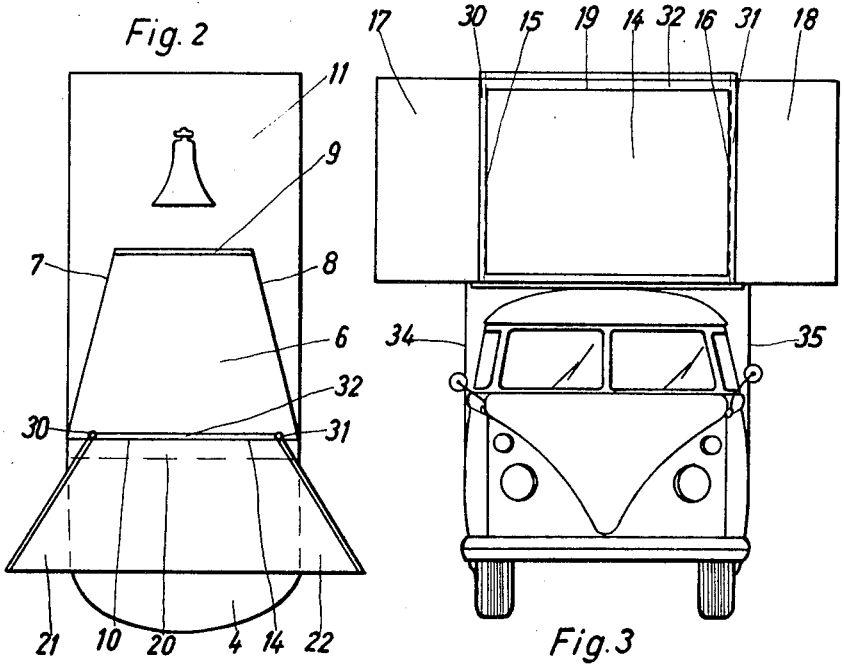
WILLY CORDES
Inventor:
Karl J. Ross
Attorney

United States Patent Office 3,475,045
Patented Oct. 28, 1969

3,475,045
PICTURE DEMONSTRATION VEHICLE
Willy Cordes, 21 Harvighorster Weg,
2056 Glinde, Hamburg, Germany
Filed Apr. 25, 1967, Ser. No. 633,524
Claims priority, application Germany, May 3, 1966,
C 38,950
Int. Cl. B62d 39/00; G03b 21/00
U.S. Cl. 296—1                    7 Claims

ABSTRACT OF THE DISCLOSURE

A vehicle adapted for the presentation of projected visual images includes a screen hingedly connected to a hinged portion of the vehicle roof so that it can be moved between a raised position in which it is visible to an audience, preferably in front of the vehicle, and a lowered position in which it is folded away flat against and inside the vehicle roof.

---

This invention relates to vehicles adapted for the presentation of projected visual images, such as for the showing of a sound motion film, wherein a projection screen or image screen is mounted on the vehicle, and wherein a projector is arranged within the interior of the vehicle itself in such manner as to project images onto this screen.

The demonstration vehicle is preferably arranged for the presentation of sound motion pictures, but it can also be used for enlarging television transmission pictures and for making photographic transparencies visible to a large audience.

It is an object of the present invention to provide an arrangement wherein a relatively large screen can be used even on vehicles of small size without the screen being a hindrance when the projection system is not in use. Furthermore, during the presentation of a film, when the motor of the vehicle must be kept running to provide the necessary power supply for the projector, annoyance of the audience by vehicle exhaust gases and exhaust noise should be avoided as far as possible.

In accordance with the present invention, a vehicle adapted for the presentation of projected visual images comprises a projection screen which can be swung upwardly by means of a roofing member pivotally mounted on the roof of the vehicle, the screen being arranged behind a seat provided for the driver of the vehicle and being pivotally connected to said movable roofing member.

The roofing member is preferably positioned at one end of the vehicle roof with hinge means between the roofing member and the vehicle roof being provided at the end of the roofing member nearer the center of the vehicle, the screen being mounted with one edge thereof at the movable end of the roofing member.

According to a preferred feature of the invention, fastening means for the screen, which is pivotally connected to the roofing member, are provided on the underside of the vehicle roof or on the underside of the roofing member. By this means the screen can be folded away against the vehicle roof when in its non-projection position, and then fastened there.

A particularly advantageous arrangement is provided if the roofing member is located at the front end of the vehicle, so that the screen is arranged practically over the driver's cab.

The invention will now be described in more detail in the following description of a preferred embodiment thereof which is given by way of example and in conjunction with the accompanying drawing, in which:

FIG. 1 is a side-elevational view of a demonstration vehicle in accordance with the invention, with the near side wall of the vehicle removed;

FIG. 2 is a plan view of the vehicle of FIG. 1; and
FIG. 3 is a front-elevational view of the vehicle of FIG. 1.

In all three views of the vehicle the screen is shown swung out into its projection position.

The vehicle comprises a chassis 1 on which the drive system and wheels 2, 3 are mounted, a driver's cab 4, and a superstructure 5 which, in the illustrated embodiment, extends forward over the driver's cab 4. Set into the vehicle roof, indicated at 11, is a roofing member 6. This roofing member 6 has two side edges 7, 8 which diverge from one another in the forward direction towards the driver's cab 4, and a rear edge 9 which is shorter than a front edge 10 thereof. An opening in the vehicle roof 11 below the roofing member 6 has the same dimensions as the roofing member. A hinge connection 12 is provided between the rear edge 9 of the roofing member and the corresponding edge of the opening in the vehicle roof so that the roofing member 6 can be pivoted into an upper position as shown in the drawing.

A further hinge connection 13 extending transversely to the length of the vehicle is provided at the movable end of the roofing member 6 in the region of the front edge 10 thereof in order to provide a pivotal mounting for a screen 14. The screen 14 has protective shutters 17, 18 at its side edges 15, 16, these shutters being pivotally mounted by means of hinge connections 30, 31 respectively. These shutters 17, 18 are preferably made of a rigid material. At the upper edge 19 of the screen a further hinge 32 is likewise provided, on which an upper protective shutter 20 is pivotally mounted. This latter shutter 20 tapers inwardly from the front of the vehicle, as can be seen in FIG. 2, and has its lateral edges connected to the upper edges of the side shutters 17, 18 by means of connecting flaps 21, 22 of flexible material, for example, foil or fabric. In this manner, the delicate screen 14 is protected from all damage when the shutters are folded into their closed positions against a screen frame extending along edges 15, 16 and 19. If the side shutters 17, 18 are pivoted out away from each other before a performance, the connecting flaps 21, 22 lift the upper shutter 20 into its raised position and this results in a stable light-shaded box which effectively shields the screen. If, after the performance, the side shutters 17, 18 are pivoted inwardly into their closed positions then the upper shutter or protective member 20 will automatically drop down to lie in front of the screen 14 due to the effect of its weight.

In FIG. 1, the roofing member 6 is shown raised and the screen 14 is shown in its projection position. The protective shutters are shown spread open.

When the screen 14 is lowered into the interior of the vehicle after the protective shutters have been closed, the various parts including the screen, indicated as a complete unit at 23 in FIG. 1, can be swung away against the underside of the vehicle roof or against the underside of the roofing member and thus be accommodated without obstructing the interior of the superstructure 5. Fastening means 24 such as a rotatable hook are provided, for example on the roofing member 6, in order to securely hold the screen in its position folded away against the vehicle roof. It will be realised that the rear or lower corners of the unit 23 will then lie against the vehicle roof outside the boundary of the roofing member 6 defined by the side edges 7, 8 thereof.

A portion 25 of the front wall of the vehicle superstructure 5 is made to be swingable about a horizontal hinge 26, and, for example, may be capable of swinging forwardly to lie on the driver's cab. To set the screen up for projection, it is first pivoted upwardly with the aid of the roofing member 6 until the lower edge of the screen is at a level above the roof of the driver's cab, then the front wall portion 25 is folded down, and finally the side shutters 17, 18 can be opened outwardly so that their lower edges are supported on the downwardly swung portion 25 of the front wall. In this manner, the screen 14 and the roofing member 6 are held in a raised position.

With this arrangement the audience can take up viewing positions in front of the vehicle so that they are not bothered by vehicle exhaust gases or noise.

Within the vehicle is a projector indicated at 27 and a reflector indicated at 28 which is secured to the rear wall 33 of the vehicle superstructure 5 whose side walls are indicated at 34 and 35 and which includes the roof 11. By means of the reflector 28 the light beam from the projector is projected on to the screen 14. The projector 27 is situated below the screen 14. A loudspeaker 29 may be arranged on the vehicle roof.

If it is desired that the projection screen 14 should be located at the rear of the vehicle, this will require a juxtaposition of the driver's cab 4 and superstructure 5 of FIG. 1. It will be clearly apparent that such a construction will be simply realised if in the present case the driver's cab 4 is not provided at the left-hand side as is shown in FIG. 1 but at the right-hand side of the vehicle superstructure 5. In this alternative arrangement a portion of the rear wall of the vehicle is preferably made capable of being hinged down to correspond to the portion 25 shown in FIG. 1.

I claim:

1. A vehicle for the presentation of projected visual images, said vehicle comprising a vehicle superstructure; a cab for the driver of the vehicle, said superstructure including a roof provided with an opening at one end, a roofing member set into said opening; first hinge means provided at the edge of the roofing member proximal to the center of the vehicle for connecting said roofing member pivotally with said roof said member having a movable end remote from said edge; a screen disposed at the movable end of said roofing member and arranged for upward pivotal movement with said roofing member, said screen being positioned rearwardly of said cab in upwardly swung state of said roofing member; second hinge means at the movable end of said roofing member for pivotally connecting said screen to said roofing member, whereby the screen can be swung down substantially into the plane of the vehicle roof against the underside of the roofing member and of the vehicle roof, the superstructure of the vehicle projecting forwardly over the cab; and hinge means on said structure for pivotally securing a portion of the front wall to the remainder of the superstructure for downward swinging movement.

2. A vehicle according to claim 1, in which fastening means are provided on the underside of one of the elements consisting of the vehicle roof and the roofing member, said fastening means being arranged for engagement with the screen when swung down against the underside of the vehicle roof in order to secure the screen in this retracted position.

3. A vehicle for the presentation of projected visual images, said vehicle comprising a vehicle superstructure; a cab for the driver of the vehicle, said superstructure including a roof provided with an opening at one end, a roofing member set into said opening; first hinge means provided at the edge of the roofing member proximal to the center of the vehicle for connecting said roofing member pivotally with said roof said member having a movable end remote from said edge; a screen disposed at the movable end of said roofing member and arranged for upward pivotal movement with said roofing member, said screen being positioned rearwardly of said cab in upwardly swung state of said roofing member, the roofing member being located at the front end of the vehicle, and the screen being arranged directly above the level of the cab in the upwardly swung state of the roofing member, the superstructure of the vehicle projecting forwardly over the cab; and hinge means on said structure for pivotally securing a portion of the front wall to the remainder of the superstructure for downward swinging movement.

4. A vehicle for the presentation of projected visual images, said vehicle comprising a vehicle superstructure; a cab for the driver of the vehicle, said superstructure including a roof provided with an opening at one end, a roofing member set into said opening; first hinge means provided at the edge of the roofing member proximal to the center of the vehicle for connecting said roofing member pivotally with said roof said member having a movable end remote from said edge; a screen disposed at the movable end of said roofing member and arranged for upward pivotal movement with said roofing member, said screen being positioned rearwardly of said cab in upwardly swung state of said roofing member; second hinge means at the movable end of said roofing member for pivotally connecting said screen to said roofing member, whereby the screen can be swung down substantially into the plane of the vehicle roof against the underside of the roofing member and of the vehicle roof; fastening means on the underside of one of the elements consisting of the vehicle roof and the roofing member for engagement with the screen when swung down against the underside of the vehicle roof to secure the screen in this retracted position, the roofing member being located at the front end of the vehicle, and the screen being arranged above the level of the cab in the upwardly swung state of the roofing member, the superstructure of the vehicle projecting forwardly over the cab; and hinge means on said structure for pivotally securing a portion of the front wall to the remainder of the superstructure for downward swinging movement.

5. A vehicle according to claim 4, in which third hinge means are provided at the side edges and upper edge of the screen, and in which protective shutters are hingedly secured by said third hinge means in such manner as to be capable of being closed over the screen.

6. A vehicle according to claim 5, in which the shutter pivotally mounted on the upper one of said third hinge means is of essentially trapezoidal shape and tapers outwardly in a direction away from its hinged edge, the side edges of this upper shutter being connected with the upper edges of the side shutters by two elements of flexible material.

7. A vehicle according to claim 4, in which a projector is arranged beneath the screen in the vehicle superstructure.

References Cited

UNITED STATES PATENTS 2,624,231   1/1953   Kingston _____ 88—24

FOREIGN PATENTS 1,419,228   10/1965   France.
482,034     3/1938   Great Britain.

PHILIP GOODMAN, Primary Examiner

U.S. Cl. X.R.

88—24; 353—13